Patented July 19, 1927.

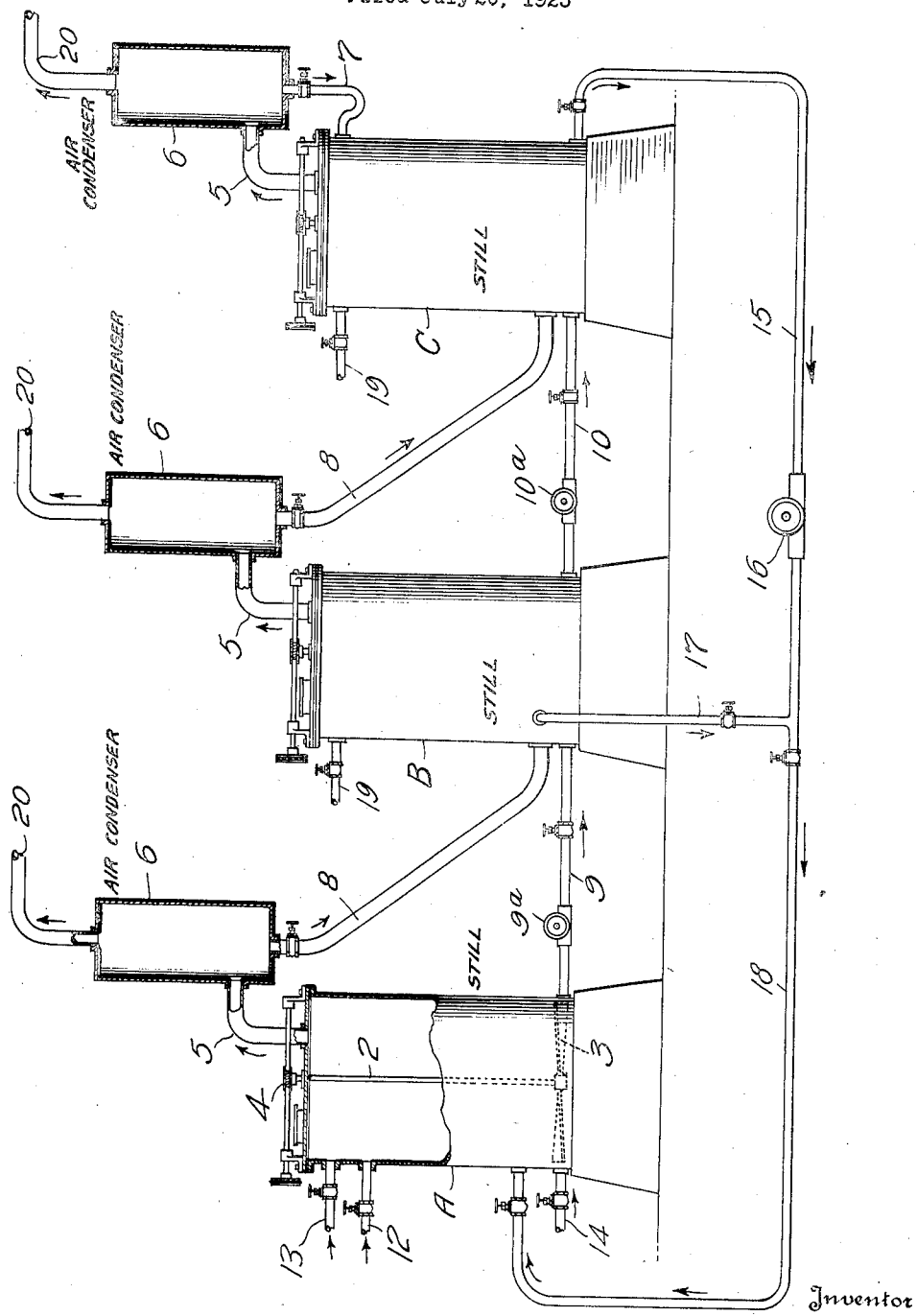

1,636,144

UNITED STATES PATENT OFFICE.

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS.

DISTILLING WITH ALUMINUM CHLORIDE.

Application filed July 20, 1925. Serial No. 44,797.

This invention relates to distilling with aluminum chloride; and it comprises a method of distilling various high boiling oils, such as gas oil and solar oil, with aluminum chloride for the production of lower boiling oils such as gasoline and kerosene wherein the oil to be treated is preliminarily distilled as a whole in the presence of an exhausted or nearly exhausted sludge containing aluminum chloride; all as more fully hereinafter set forth and as claimed.

Aluminum chloride is now used on a large scale as a converting agent in the production of gasoline and kerosene from higher boiling oils; the high boiling oil being distilled in the presence of a charge of chloride. As the operation goes on, the converting activity of the chloride which is at first very great, gradually slackens and at some point it becomes economical to remove the charge and replace it by fresh active chloride. At this time the chloride is contained in a heavy tarry or pasty material. Generally, however it still retains some activity.

While aluminum chloride conversion may be effected with crude oil or any of its distillates, in making gasoline and kerosene, it is the usual practice to employ the cheaper kinds of relatively heavy distillates; namely the oils marketed as gas oil and solar oil.

In the present invention I distil oils in the presence of aluminum chloride to produce gasoline, or gasoline and kerosene, in much the usual way but preliminarily thereto I submit the oil to a purifying distillation and in so doing I utilize residual activity of aluminum chloride which has reached a stage of exhaustion where it is considered economic to remove it and replace by a fresh charge. By this preliminary distillation the oil is rendered better adapted to the regular aluminum chloride operation. Any low boiling oils formed in the preliminary operation are of course recovered; but their production is not the main object in this treatment. Any vapors of aluminum chloride which may be formed in using the exhausted, or nearly exhausted sludge are also utilized; they being sent forward to join the charge undergoing chloride conversion.

This method is particularly applicable to asphalt base oils although by no means limited thereto. The formation of thick asphaltic sludge takes place earlier with asphaltic oils than with others and the period of activity with aluminum chloride is correspondingly limited. It is for this reason that it is advantageous to first treat asphaltic oils with exhausted or partially exhausted aluminum chloride.

If, for example, gas oil is to be converted into gasoline or into a mixture of gasoline and kerosene, the gas oil as a whole is distilled from a suitable still in the presence of aluminum chloride residues. Any low boiling oils formed in the operation may be taken off as a separate cut or they may join the body of oil distilled over and be recovered from it later; as in the regular distilling operation. The distillate produced is subjected to the action of aluminum chloride in the usual ways and with the usual apparatus; the aluminum chloride used in the conversion being withdrawn as an exhausted or nearly exhausted sludge at such stage of activity as may be economic. Whatever its conditions, the withdrawn material is transferred to a still in which the described preliminary purifying distillation is effected. In this purifying distillation there is commonly the formation of vapors of aluminum chloride to a greater or less extent; and this vaporized material is in highly active form. The vapors are withdrawn and are sent to the regular distilling operation. Or they may be simply allowed to go over with the vapors in distilling and be condensed and collected with the oil.

In the accompanying drawings I have shown one form of apparatus useful in the performance of my process.

In this showing, A, B and C are a plurality of stills (any number may be used). Each still is provided with the shaft 2 and stirrer 3 and operated through driving mechanism indicated as a whole at 4. Each still is provided with vapor line 5 leading to air cooled condenser 6; the last still in the series has its condenser arranged as a partial reflux so that if desired certain condensates may be returned to the still. The air-cooled condensers of stills A and B, however, are arranged to deliver condensate to stills B and C, respectively, through lines 8. Line 9 is provided between stills A and B and line 10 betwen stills B and C for transferring oil from one still to the other when and if occasion should arise. Still A is provided with oil inlet 12 and aluminum chloride and oil inlet 13, and with draw-off outlet 14 for cleaning out purposes. Still C is within communication with stills B and A through line 15 provided with pump 16. Exhausted or partially exhausted aluminum chloride sludge may be transferred from still C to still B through lines 15 and 17 or to still A through lines 15 and 18 by operation of the pump 16 and proper manipulation of the valves on these lines. Stills B and C are provided with inlets 19 for introduction of oil or additional aluminum chloride with oil if necessary.

In the operation of the process, assuming that a distillation has been carried out in still C the exhausted sludge or partially exhausted sludge is transferred by means of lines 15 and 18 to still A which has previously been filled with oil, preferably of an asphaltic base nature, such as solar oil. Some aluminum chloride may be added directly to the still A. Distillation is carried out in still A so that practically all of the contents are distilled over into reflux condenser 6. As the process continues, and the temperatures are regulated so that the vapors sent to the air-cooled condenser maintains its temperature at such a point that the preponderance of vapors condense in the air-cooled condenser 6 and are sent to still B through line 8. The contents of still A are therefore distilled over as a whole in the presence of exhausted or partially exhausted aluminum chloride delivered from still C to still A. The process may be repeated in still B, partially exhausted aluminum chloride being used and being delivered to still B through line 17. Additional oil may be introduced to still B through line 19. In both stills A and B there will be formation of some lighter hydrocarbons and these may be collected through lines 20 leading from the air-cooled condensers 6 to water-cooled condensers (not shown). After the contents of still B are distilled over into still C the same way as the contents of still A were distilled over into still B and in still C, more oil may be added to a still C through line 19, and in use aluminum chloride is introduced to C through line 19 in admixture with the oil. From 2 to 5 per cent is sufficient quantity, and the distillation in still C is conducted in such a way that the fresh aluminum chloride converts the previously treated higher boiling hydrocarbons into lower boiling hydrocarbons. When the process has been conducted to that stage where the sludge may be withdrawn by means of the pump 16 and where the desired percentage of lower boiling hydrocarbons have been distilled out, the exhausted or partially exhausted sludge is transferred from still C to still B or A as described.

During the operation of the process it is sometimes impracticable to distil the entire contents of stills A and B to the next still in the series through the condensers 6 and therefore oil may be passed from still A to still B through line 9 by means of the pump 9ª or from still B to still C through line 10 by means of the pump 10ª. Any aluminum chloride which distils out from the oil from still A to condenser 6 or from still B to condenser 6 is so much good or active aluminum chloride and therefore accompanies the oil so that the active aluminum chloride is sent to the still C. But the totally or partially exhausted aluminum chloride remains in still A. Or it may be desirable at times to pump the exhausted or partially exhausted sludge from still B to still A, which can be done by reversing pump 9ª, but ordinarily I find that this is not necessary.

In operation each of the stills may be supplied with oil so that each still in the series takes liquid oil from the next preceding still. The vapors are partially condensed in the air-cooled condenser and the heavy oil and aluminum chloride are sent forward to the next still in series. At the same time any light products which are formed may be condensed after they leave the air-cooled condenser 6. Residual oil may be sent from one still to the other through lines 9 and 10 and the stills operated simultaneously. But in this instance it is desirable to return from the last still to the first the sludge and heavy oils in order that in the first still, from which at least the preponderance of the oil is distilled as a whole, the oil may be given the preliminary purifying treatment.

What I claim is:

1. In the production of lower boiling oils from higher boiling oils with the aid of aluminum chloride, the process which comprises preliminarily subjecting the oil to be distilled with aluminum chloride to a purifying distillation with exhausted aluminum chloride sludge and thereafter again distilling the oil with fresh aluminum chloride.

2. In the methodical distillation of oils with aluminum chloride, the process which comprises distilling such oil with aluminum chloride in a plurality of successive stills, each delivering oil to the next in series and each also delivering aluminum chlorides to the next in series, the aluminum chloride required in the first still in the series being furnished at least in part by returning thereto chloride sludge from the last still in the series.

3. In the methodical utilization of aluminum chloride in distilling petroleum oil to produce oils of lower boiling point, the process which comprises supplying oil to a battery of stills arranged in series and each taking oil from the next preceding, distilling the oil in each such still to furnish vapors, partially cooling such vapors to condense and abstract heavy oils and aluminum chloride therefrom while transmitting residual vapors to a condenser, transmitting condensed heavy oils and aluminum chloride coming from each still to the next in series and returning sludge and heavy oil from the last still in series to the first still in series.

4. In the production of oils of lower boiling point by distillation of oils with aluminum chloride, the process which comprises distilling a body of oil for a time with aluminum chloride which is exhausted or partially exhausted from prior treatment of oil, condensing and collecting evolved aluminum chloride vapors together with the oil so distilled, and once more distilling the oil with aluminum chloride, the chloride used in the second distillation including that evolved and collected from the first distillation together with additional aluminum chloride, and the chloride used in the first distillation including exhausted or partially exhausted sludge from the subsequent distillation.

In testimony whereof I have hereunto affixed my signature.

ALMER McDUFFIE McAFEE.